United States Patent
Bhat et al.

(10) Patent No.: US 9,503,548 B2
(45) Date of Patent: Nov. 22, 2016

(54) SUBSCRIBER BASED PRIORITY OF MESSAGES IN A PUBLISHER-SUBSCRIBER DOMAIN

(71) Applicant: International Business Machines Corporation, Armonk, NY (US)

(72) Inventors: Chethan Bhat, Bangalore (IN); Sanjay M. Kesavan, Bangalore (IN); Rajesh Lalgowdar, Bangalore (IN); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 14/064,390

(22) Filed: Oct. 28, 2013

(65) Prior Publication Data

US 2015/0120852 A1 Apr. 30, 2015

(51) Int. Cl.
*G06F 15/16* (2006.01)
*H04L 29/08* (2006.01)
*H04L 12/58* (2006.01)

(52) U.S. Cl.
CPC ............. *H04L 67/322* (2013.01); *H04L 51/26* (2013.01)

(58) Field of Classification Search
CPC ............................. H04L 29/08; H04L 67/322
USPC ................. 709/207, 203, 231, 219
See application file for complete search history.

(56) References Cited

U.S. PATENT DOCUMENTS

| | | | |
|---|---|---|---|
| 6,112,102 A | 8/2000 | Bhatia et al. | |
| 7,181,518 B1 * | 2/2007 | Matsumoto | ......... H04L 12/5855 709/203 |
| 7,379,963 B1 | 5/2008 | Khare et al. | |
| 7,519,669 B2 * | 4/2009 | Nikolov | ................. 709/206 |
| 7,792,908 B2 | 9/2010 | Charters et al. | |
| 7,831,670 B2 | 11/2010 | Goodman et al. | |
| 7,941,448 B2 | 5/2011 | Eslambolchi et al. | |
| 8,019,816 B2 | 9/2011 | Dorai et al. | |
| 8,352,174 B2 * | 1/2013 | Milstein et al. | ............. 701/400 |
| 8,443,182 B2 * | 5/2013 | Lu et al. | ............................ 713/2 |
| 8,458,192 B1 * | 6/2013 | Procopio | ........... G06F 17/30702 707/748 |
| 8,850,453 B1 * | 9/2014 | Zhang | ................... G06F 3/0482 719/313 |
| 2005/0246186 A1 * | 11/2005 | Nikolov | .............. G06Q 10/107 709/206 |
| 2005/0273499 A1 * | 12/2005 | Goodman | ........... G06Q 10/107 709/206 |

(Continued)

OTHER PUBLICATIONS

Shabangu, "Guaranteed Real-Time Delivery of Context-Aware Messages in Publish/Subscribe Systems", Department of Computer Science, Faculty of Science and Agriculture, University of Zululand, 2007, <http://uzspace.uzulu.ac.za/bitstream/handle/10530/105/Guaranteed%20real-time%20delivery%20of%20context-aware%20messages%20-%20P.S.%20Shabangu.pdf?sequence=1>.

(Continued)

*Primary Examiner* — Philip Chea
*Assistant Examiner* — Hassan Khan
(74) *Attorney, Agent, or Firm* — Walter L. Rudberg; Derrick J. Carman (57) ABSTRACT

Embodiments of the present invention disclose a method, computer program product, and computer system for prioritizing messages based on subscriber preferences. In an embodiment of the invention, an application server computer determines that a subscriber is subscribed to at least one topic space. The application server computer receives one or more topic priority preferences from the subscriber, and a plurality of messages from the at least one topic space. The application server computer prioritizes the plurality of messages based on the received topic priority preference, and sends the prioritized plurality of messages to the subscriber.

11 Claims, 4 Drawing Sheets

(56) References Cited

U.S. PATENT DOCUMENTS

| | | | |
|---|---|---|---|
| 2006/0056394 A1 | 3/2006 | Kuure et al. | |
| 2007/0061195 A1* | 3/2007 | Liu | G06Q 30/02 705/14.41 |
| 2008/0091340 A1* | 4/2008 | Milstein | G06T 7/0083 701/533 |
| 2008/0189388 A1* | 8/2008 | Khare | G06F 17/30867 709/217 |
| 2009/0125489 A1* | 5/2009 | Barker | G06F 9/542 |
| 2011/0047032 A1* | 2/2011 | Kumar | G06Q 30/02 705/14.66 |
| 2011/0225293 A1* | 9/2011 | Rathod | G06F 17/30867 709/224 |
| 2011/0246758 A1* | 10/2011 | Lu | G06F 9/442 713/2 |
| 2012/0215872 A1* | 8/2012 | Beardsmore | H04L 51/14 709/207 |
| 2012/0272252 A1 | 10/2012 | Beardsmore et al. | |
| 2015/0120854 A1 | 4/2015 | Bhat et al. | |

OTHER PUBLICATIONS

Souravlias, et al., "On Novelty in Publish/Subscribe Delivery", Computer Science Department, University of Ioannina, Greece, 978-1-4244-6523-1/10 © 2010 IEEE, ICDE Workshops 2010, pp. 20-22, <http://ieeexplore.ieee.org/stamp/stamp.jsp?tp=&arnumber=5452770>.

"Method and apparatus for subscribing preferred rated messages in a composite publish subscribe messaging system", An IP.com Prior Art Database Technical Disclosure, Authors et al., IPCOM000205862D, IP.com Electronic Publication, Apr. 6, 2011, <http://ip.com/IPCOM/000205862>.

* cited by examiner

SUBSCRIBER BASED PRIORITY OF MESSAGES IN A PUBLISHER-SUBSCRIBER DOMAIN

FIELD OF THE INVENTION

The present invention relates generally to the field of multicomputer data transferring and communication, and more particularly to subscriber based priority of messages in a publisher-subscriber domain.

BACKGROUND

Publish/subscribe (pub-sub) data processing and messaging systems have become very popular in recent years as a way of distributing data messages. Pub-sub messaging systems are a messaging technology that may be used in Internet based or other networked environments. In a pub-sub network, one or many publisher applications send messages to the network and subscriber applications register subscriptions to indicate the subscriber's interest in receiving certain types of messages pertaining to certain topics. If a published message matches one of the subscriptions stored for a particular subscriber, the message is passed to the subscriber by a subscriber messaging engine. In typical pub-sub messaging systems, it is the responsibility of a messaging engine to which the publisher application is connected to push messages to messaging engines connected to relevant, or subscribed, subscriber applications. It is common, especially in cloud computing scenarios, to have a messaging system with hundreds, or more, messaging engines.

In typical pub-sub messaging systems, the publisher sets a message priority level for each message. This priority level reflects the importance of a given message, determined by the publisher, relative to the other messages published by that publisher. In typical pub-sub messaging systems, subscribers are not able to affect the order in which the messaging engine delivers the messages. As a result, subscribers may often receive messages that are less important to the subscriber than other messages. Publishers also set expiration times for messages. Once a message reaches its expiration time, it is deleted from the pub-sub messaging system. Because the priorities and expiration times are set by the publisher, some messages may expire before they are ever delivered to the subscriber, resulting in the subscriber never receiving a message with high priority.

SUMMARY

Embodiments of the present invention disclose a method, computer program product, and computer system for prioritizing messages based on subscriber preferences. In an embodiment of the invention, an application server computer determines that a subscriber is subscribed to at least one topic space. The application server computer receives one or more topic priority preferences from the subscriber. The application server computer receives a plurality of messages from the at least one topic space. The application server computer prioritizes the plurality of messages based, at least in part, on the received topic priority preference, and the application server computer sends the prioritized plurality of messages to the subscriber.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

Figure 1:
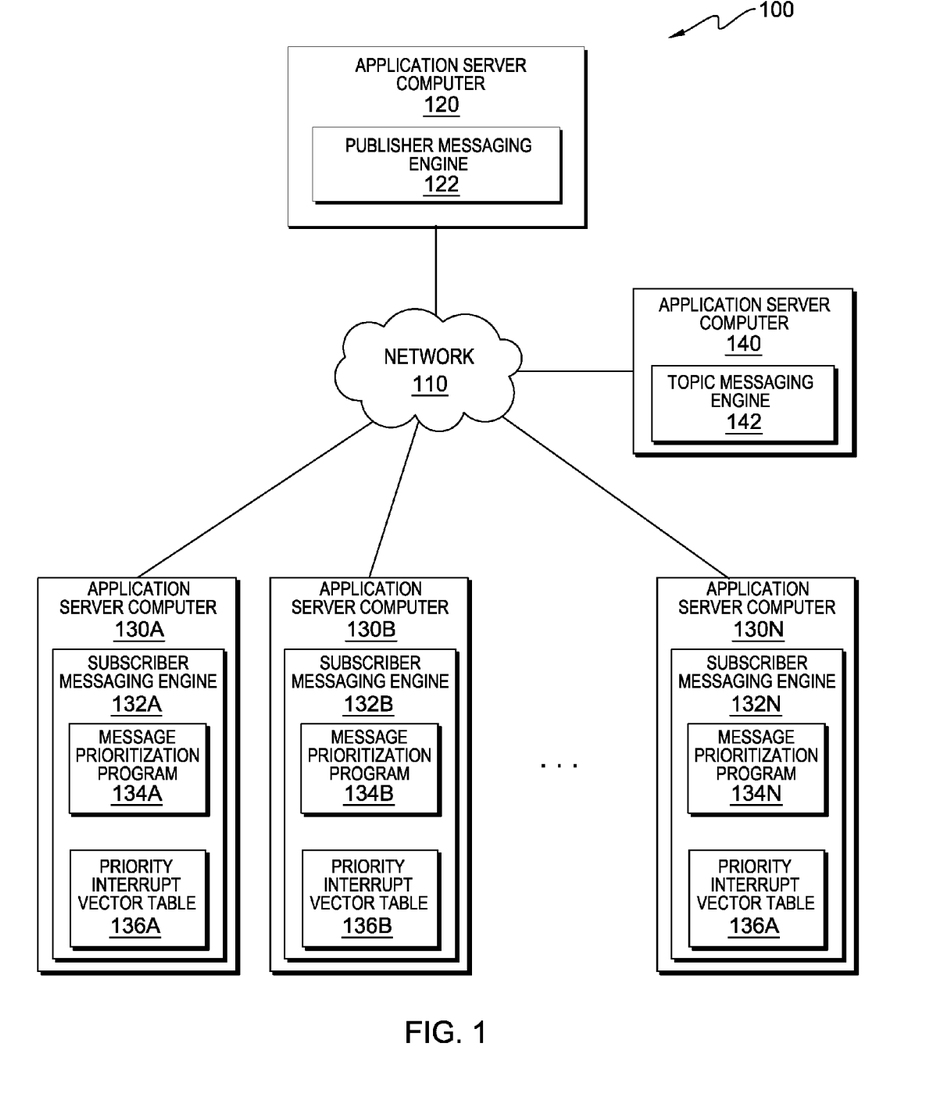
FIG. 1 is a functional block diagram depicting a messaging distribution environment, in accordance with an embodiment of the invention.

The present invention will now be described in detail with reference to the figures. FIG. 1 is a functional block diagram depicting a message distribution environment, generally designated 100, in accordance with an embodiment of the invention. Message distribution environment 100 includes application server computer 120, application server computer 140, and application server computers 130A to 130N, all interconnected via network 110. Message distribution environment 100 is representative of a messaging system, including any number of messaging clients. In an embodiment, message distribution environment 100 includes messaging engines with publisher applications, messaging engines with subscriber applications, and messaging engines with topic space applications. In various other embodiments of the present invention, messaging clients within message distribution environment 100 are connected via network 110 in a network architecture such as a bus network topology, a mesh networking topology or a tree structure topology. Network 110 can be, for example, a local area network (LAN), a wide area network (WAN) such as the Internet, or any combination of the two, and can include wired, wireless, or fiber optic connections. In general, network 110 can be any combination of connections and protocols that will support communication and exchange of messages between application server computer 120, application server computer 140, and application server computers 130A to 130N, including distributed computing such as cloud computing. In various embodiments of the present invention, application server computers 120, 140, and 130A to 130N can be laptop computers, tablet computers, netbook computers, PCs, PDAs, smart phones, or any programmable electronic device capable of communicating with application server computer 120 via network 110. Application server computers 130A to 130N may represent a computing system utilizing clustered computers and components to act as a single pool of seamless resources when accessed through a network.

Application server computer 120 includes publisher messaging engine 122. Publisher messaging engine 122 is a server component capable of providing messaging functions of a service integration bus, for example, enabling the bus to send and receive messages. Publisher messaging engine 122 manages the bus resources and allows applications to communicate with the bus. In an embodiment, publisher messaging engine 122, includes an application for publishing, or pushing, topic messages to topic messaging engine 142. Subscriber messaging engines, such as subscriber messaging engine 132A, are connected to topic messaging engine 142 and include an application to receive topic messages published from publisher messaging engine 122. Topic messages are messages pertaining to a particular topic to which a number of subscribers have subscribed to receive messages. In an embodiment, topic messages also include message lists, or message groups, containing multiple messages. Publishers also have the ability to set expiry times for the messages they publish. The default is to have the message remain in message distribution environment 100 indefinitely, but a publisher may set a particular time period after which the message will expire.

Application server computer 140 includes topic messaging engine 142. Topic messaging engine 142 manages the topic spaces to which publisher messaging engine 122 publishes messages. Topic messaging engine 142 is a server component capable of providing messaging functions of a service integration bus, for example, enabling the bus to send and receive messages. Topic messaging engine 142 manages the bus resources and allows applications to communicate with the bus.

Application server computers 130A to 130N include subscriber messaging engines 132A to 132N. Subscriber messaging engine 132A to 132N (hereinafter 132) is a server component capable of providing messaging functions of a service integration bus, for example, enabling the bus to send and receive messages. Subscriber messaging engine 132 receives topic messages from topic messaging engine 142 via network 110. Subscriber messaging engine 132 contains a destination stream which includes a list of messages to be delivered to the subscriber. The destination stream is a data structure, such as a heap data structure which organizes the queued messages for delivery based on the messages' relative priority.

Each of subscriber messaging engines 132 includes message prioritization program 134. Message prioritization program 134A to 134N (hereinafter 134) determines the order in which messages delivered from publisher messaging engine 122 to subscriber messaging engine 132 should be delivered to the subscriber. Message prioritization program 134 receives topic messages from topic messaging engine 142. In the depicted embodiment, a subscriber inputs preferences into message prioritization program 134 for different topics to which publisher messaging engine 122 may publish messages. For example, preferences can indicate the priority that each message topic should receive when being delivered to the subscriber. Message prioritization program 134 reprioritizes the messages received by subscriber messaging engine 132 according to the subscriber preferences. In addition to reprioritizing messages based on the message topic, message prioritization program 134 may also reprioritize messages that are about to expire. If a message is near expiry and has yet to be delivered, message prioritization program 134 reprioritizes the message for delivery sooner by, for example, placing an interrupt to the priority interrupt vector table 136A to 136N (herein after 136) contained in subscriber messaging engine 132.

Subscriber messaging engine 132 contains priority interrupt vector table 136. Priority interrupt vector table 136 is a table of interrupt vectors which processes various requests to interrupt a running program in order to run another program, called an interrupt request. In an embodiment of the present invention, priority interrupt vector table 136 contains a list of interrupt vectors. Interrupt vectors instruct a processor to save its current state and begin running a different program thread. After the interrupting thread completes, the processor returns to its previous state and continues from that point. In an embodiment of the present invention, the priority interrupt vector table includes the priority interrupts that interrupt subscriber messaging engine 132 in order to reprioritize messages received from publisher messaging engine 122 via network 110.

Figure 2:
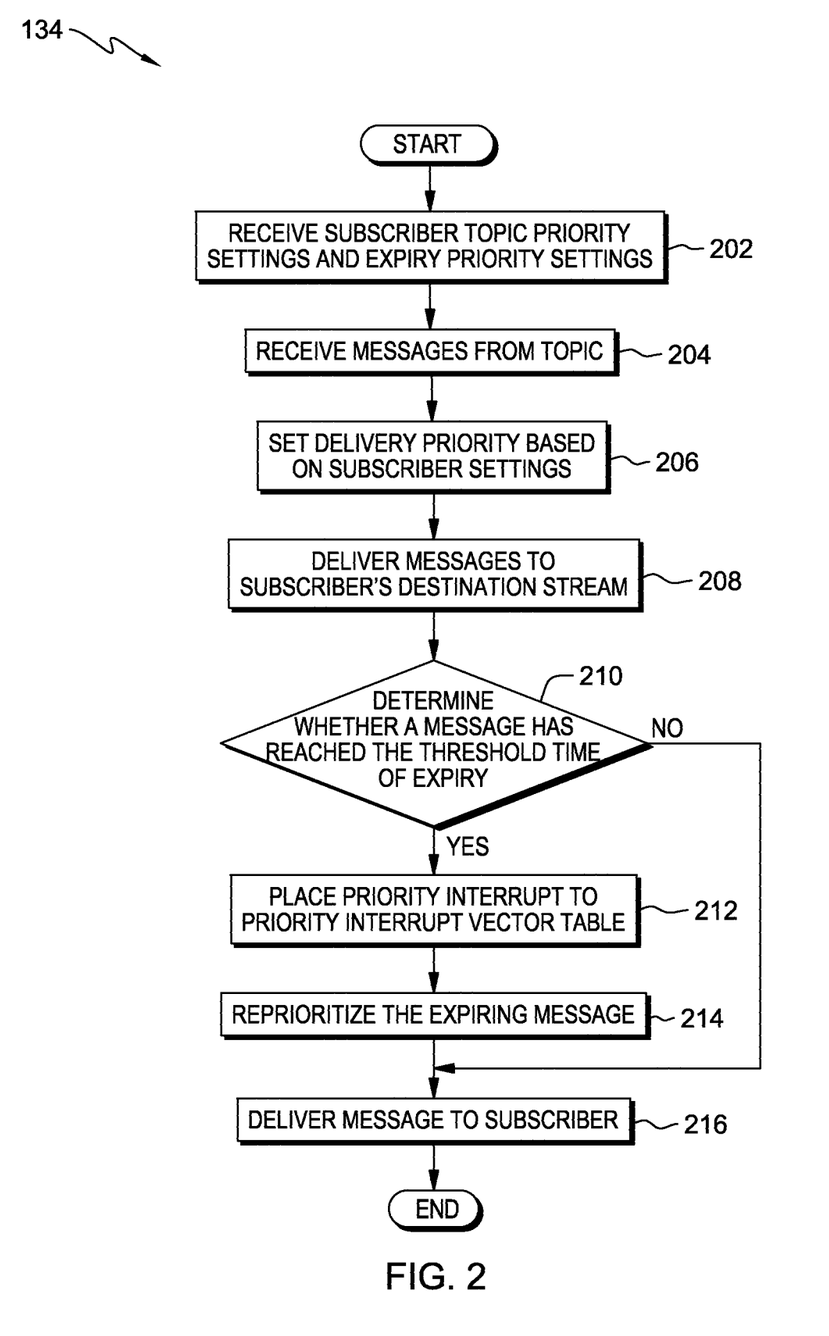
FIG. 2 is a flowchart depicting operational steps of a message prioritization program, in accordance with an embodiment of the present invention.

FIG. 2 is a flowchart depicting operational steps of a subscriber message prioritization program, generally designated 134, in accordance with an embodiment of the present invention.

In the depicted embodiment, initially, a publisher, such as a news provider, publishes one or more messages via a publisher messaging engine, such as publisher messaging engine 122, to one or more topic spaces which are stored by topic messaging engine 142. Topic messaging engine 142 is located on application server computer 140, which is connected to network 110. A topic space is a point of addressability within a bus and facilitates publish/subscribe messaging capabilities. The publisher sets the initial priority of each message according to the publisher's determination of the relative priority of each message compared to other messages it is publishing. A subscriber, such as a consumer interested in a given topic, subscribes to the one or more topics in order to automatically receive, via network 110, messages published by the publisher to the topics to which the subscriber is subscribed. The subscriber messaging engine, which includes message prioritization program 134, receives messages from the topic spaces and organizes them according to the messages' relative priority settings.

Message prioritization program 134 receives topic priority settings and expiry priority settings (step 202). In the depicted embodiment, message prioritization program 134 receives the topic priority settings and expiry priority settings from the subscriber. In another embodiment, message prioritization program 134 receives the expiry priority settings from subscriber messaging engine 132. The topic priority settings include subscriber preferences which allow the subscriber to dictate the order in which messages from different publishers should be prioritized for delivery. For example, a subscriber may wish to receive messages regarding topic A before receiving messages regarding topic B. In this example, the priority settings provide instructions that message prioritization program 134 uses to change the priority attached to messages on topic A and topic B so that topic A will be delivered first to the subscriber.

Additionally, in the depicted embodiment, message prioritization program 134 receives expiry priority settings from subscriber messaging engine 132. In another embodiment, message prioritization program 134 receives expiry priority settings from the subscriber. Expiry priority settings creates a threshold time of expiry. For example when a message is about to expire because of an expiration time set by the publisher, the expiry priority time settings can increase the priority of those messages about to expire which ensures that the messages are delivered to the subscriber before they expire. In an exemplary embodiment of the present invention, the subscriber may input the topic priority settings and the expiry priority settings through an application programming interface or user interface display such as a menu. After receiving the topic priority settings and expiry priority settings, message prioritization program 134 saves the settings in memory such as local cache, RAM, or external storage.

Message prioritization program 134 receives messages from a topic space via network 110 (step 204). In an illustrative example, publisher messaging engine 122 publishes messages to a number of different topic spaces, e.g. Topic A and Topic B, to which subscriber messaging engine 132 is subscribed. The subscriber then receives the published messages from Topic A and Topic B through an input stream such as network 110. The published messages are processed according to capabilities of the subscriber messaging engine 132 which includes message prioritization program 134. Processing includes adding messages from Topic A and Topic B to a destination stream and assigning a priority value to each message. The destination stream is a data structure, such as a min-heap structure, that organizes the messages according to relative priority in order to determine the order in which the messages are delivered to the subscriber. A min-heap is a binary tree data structure in which a heap property, such as priority value, requires that all nodes, i.e. messages, having a lower priority value be delivered before those nodes with a higher priority value. For example, messages that have a priority value of 1 are delivered before messages with a priority value of 2, etc. As a secondary ordering mechanism, the nodes can be placed in the queue in the order in which they are received from publisher messaging engine 122.

Message prioritization program 134 sets the message priority value for each message based on the subscriber topic priority settings (step 206). In the depicted embodiment, each message is assigned a priority value based on the topic of the message and the subscriber priority settings. In the illustrative example referenced above, where a min-heap destination stream is being used, topic A and topic B will have different priority values assigned to them where the higher priority message, i.e. more important message, has a lower priority value applied to it. For example, if Topic A is deemed to be higher priority by the subscriber settings, then Topic A messages may have a priority value of 1 assigned while Topic B messages have a priority value of 2 assigned.

Messaging prioritization program 134 delivers the messages to the subscriber's destination stream (step 208). As discussed above, the destination stream is a data structure which orders the messages for delivery based on the relative priority of the messages. Therefore, in the above example, messages from Topic A would be delivered to the subscriber first, in the order in which they were published, and then messages from Topic B would be delivered in the order in which they were published.

In the embodiment depicted in FIG. 2, messaging prioritization program 134 determines whether a message has reached its threshold time of expiry (decision block 210) by, for example, comparing the expiry threshold, as set by the subscriber, to the expiration time set by the publisher. When a message reaches its threshold time of expiry, which is set by, for example, subscriber messaging engine 132, the message is about to expire before it can be delivered to the subscriber. If a message has not reached its threshold time of expiry (decision block 210, no branch), message prioritization program 134 proceeds to deliver the messages to the subscriber (step 216) according to priority settings. When messaging prioritization program 134 determines that a message has reached its threshold time of expiry (decision block 210, yes branch), it triggers an interrupt to the priority interrupt vector table 136 (step 212). In the depicted embodiment, priority interrupt vector table 136 includes a messaging-ID, subscriber destination information, and a priority value for each message. When the interrupt is triggered for a specific messaging-ID, message prioritization program 134 changes the priority value of the identified message so that the message will be delivered with higher priority.

Message prioritization program 134 reprioritizes the expiring message for delivery according to the interrupt to the priority interrupt vector table (step 214). Reprioritizing the message changes the priority value of the message. In an exemplary embodiment of the present invention, reprioritizing the message causes the message to be placed earlier in the destination stream so that the message will be delivered sooner than if left with the previous priority value.

After the priority of a message is increased because of the threshold time of expiry and the message reaches the top of the subscriber's destination queue or, alternatively, if the message reaches the top of the subscriber's destination queue without reaching its expiry threshold, message prioritization program 134 delivers the message to the subscriber (step 216).

Figure 3:
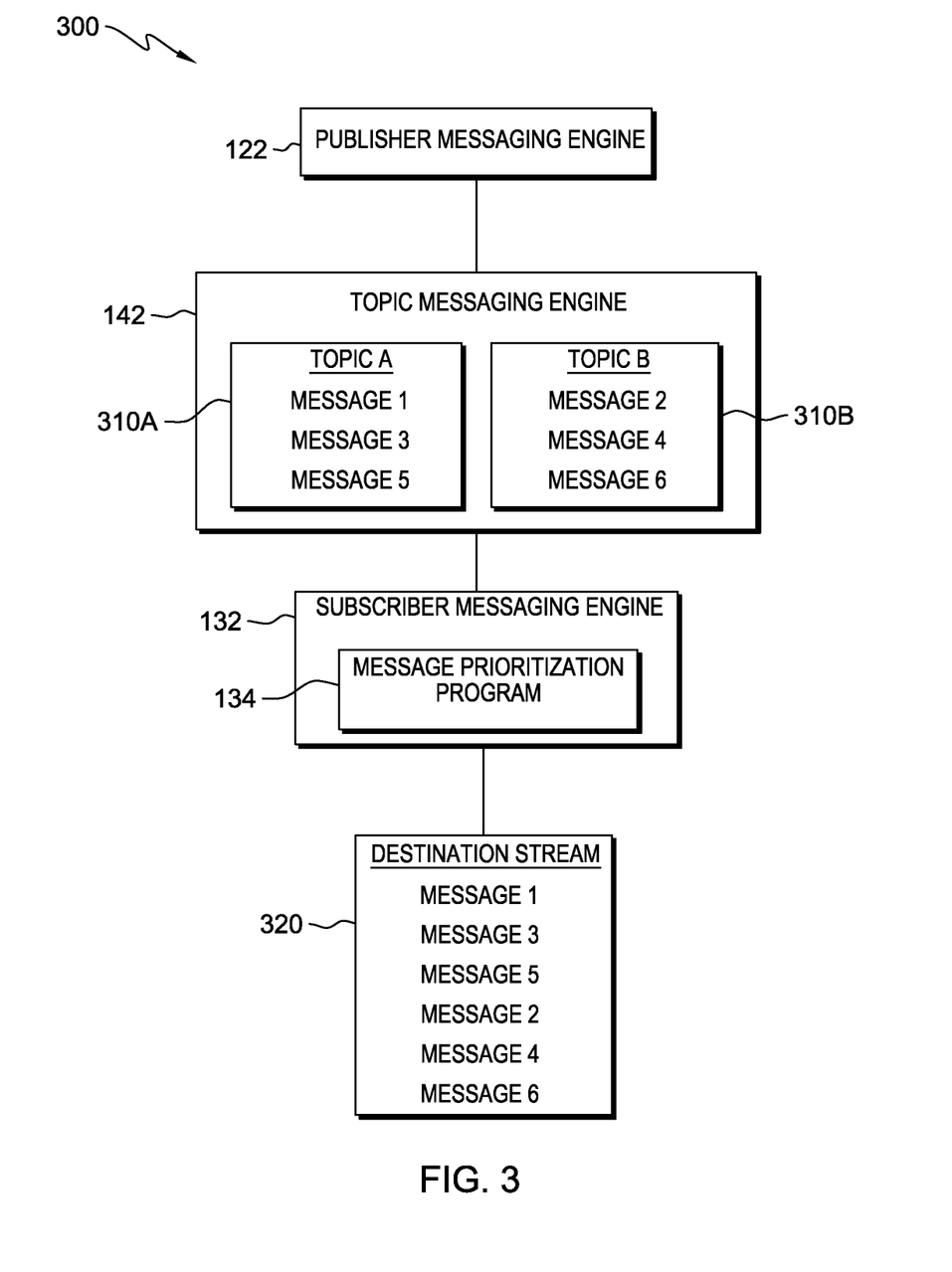
FIG. 3 is a functional block diagram depicting an exemplary message distribution with operation of the message prioritization program of FIG. 2, in accordance with an embodiment of the present invention.

FIG. 3 is a functional block diagram depicting a pub-sub messaging environment, generally designated 300, in accordance with an embodiment of the present invention. It should be appreciated that FIG. 3 provides only an illustrative embodiment of one implementation and does not imply any limitations with regard to the environments in which different embodiments may be implemented.

Publisher messaging engine 122 publishes a number of messages, in this case six, to Topic A 310A and Topic B 310B, which can be included in topic messaging engine 142. As one of skill in the art will appreciate, Topic A 310A and Topic B 310B are pub-sub topics which may be named logical channels that route to a message broker or event bus. Topics represent a type or class of message in which all of the messages belonging to that topic have a common theme or subject. For example, Topic A 310A may be a topic associated with messages related to "sports," while Topic B 310B may be a topic associated with messages related to "weather." According to FIG. 3, messages 1-6 are published in order with message 1 being published first and message 6 being published last. Messages 1, 3, and 5 are published to Topic A 310A and messages 2, 4, and 6 are published to Topic B.

Each of these messages has a priority valued assigned to it by the publisher based on, for example, the publisher's determination of the importance of a given message compared to the other messages in a given topic. According to the embodiment of the present invention depicted in FIG. 3, the publisher-assigned prioritization is not determinative and so each of messages 1-6 may be assumed to have the same publisher priority value. If the subscriber priority values are identical, as they are in the exemplary embodiment depicted in FIG. 3, delivery will default to a secondary method for delivering messages 1-6, such as in chronological order.

Subscriber messaging engine 132, which includes message prioritization program 134, is a subscriber messaging engine that is subscribed to both Topic A 310A and Topic B 310B. Subscriber messaging engine 132 receives messages 1-6 in chronological order with message 1 being first, then message 2, and so on until message 6 is received.

Messaging prioritization program 134, in accordance with the embodiment depicted in FIG. 2, receives the topic priority settings from the subscriber for prioritization of Topic A 310A and Topic B 310B. In the illustrative embodiment depicted in FIG. 3, messaging prioritization program 134 received instructions to prioritize messages that are delivered to subscriber messaging engine 134. In the depicted embodiment, messages from Topic A 310A, i.e., messages 1, 3, and 5, are placed in destination stream 320 to be delivered before messages received from Topic B 310B, i.e., messages 2, 4, and 6. Each set of messages coming from a single topic are ordered, for example in the order in which they were published.

Figure 4:
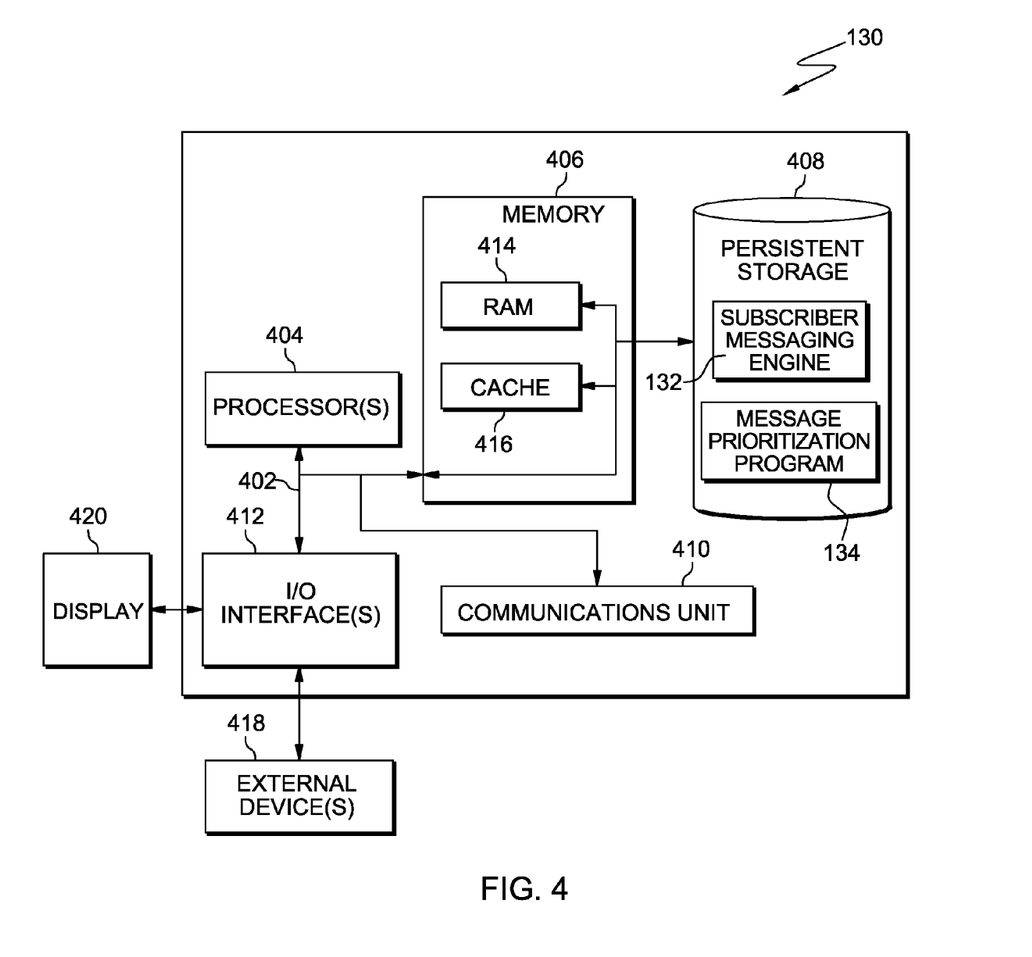
FIG. 4 depicts a block diagram of internal and external components of the application server computer executing the message prioritization program in the messaging distribution environment of FIG. 1, in accordance with an embodiment of the present invention.

FIG. 4 depicts a block diagram of components of application server computers 130 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Application server computer 130 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Subscriber messaging engine 132 and message prioritization program 134 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including application server computers 120. In these examples, communications unit 410 includes one or more network interface cards. Communications unit 410 may provide communications through the use of either or both physical and wireless communications links. Subscriber messaging engine 132 and message prioritization program 134 may be downloaded to persistent storage 408 through communications unit 410.

I/O interface(s) 412 allows for input and output of data with other devices that may be connected to application server computer 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., subscriber messaging engine 132 and message prioritization program 134, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for prioritizing messages, the computer program product comprising:
a non-transitory computer readable storage medium and program instructions stored on the on the non-transitory computer readable storage medium, the program instructions comprising:
program instructions to receive, by a message engine, a plurality of messages from a publisher, wherein each message of the plurality of messages correspond to at least one topic space, and comprise a message expiration time and a publisher priority value, and wherein the publisher priority value details an importance level for a corresponding message;
responsive to receiving the plurality of messages from the publisher, program instructions to prioritize, by the message engine, the plurality of messages, based on the priority value and the corresponding at least one topic space;
program instructions to determine, by the messaging engine, that a subscriber is subscribed to a topic space corresponding to at least one message of the plurality of messages;
program instructions to receive, by the messaging engine, one or more topic priority preferences from the subscriber and an expiration threshold priority setting from the subscriber, wherein the one or more topic priority preferences detail a ranking associated with each topic space, and wherein the expiration threshold priority setting, details a threshold amount of time to increase a priority level of a message;
responsive to receiving one or more topic priority preferences from the subscriber program instructions to determine, by the message engine, a delivery order of the plurality of messages, wherein the delivery order comprises:
program instructions to sort the plurality of messages based on topic space: program instructions to identify at least a first topic space, and a second topic space, wherein the first topic space is a highest ranked topic space and the second topic space is a second highest ranked topic space;
program instructions to place a first set of messages that correspond to the first topic space in a first position of a delivery order based on the publisher priority value; and
program instructions to place a second set of messages that correspond to the second topic space in a second position of a delivery order based on the publishers priority value;
program instructions to send, by the message engine, the plurality of messages to the subscriber based on the determined delivery order;
determine, by the messaging engine, whether at least one message, of the plurality of messages, is within the expiration threshold priority setting as set by the subscriber, prior to being delivered to the subscriber;
in response to determining that at least one message of the plurality of messages, is within the expiration threshold priority setting, increase the determined priority of the at least one message by, placing an interrupt to an interrupt vector table ensuring, that the at least one message will be delivered prior to the message expiration time; and
responsive to increasing the determined priority of the at least one message, reprioritize, by the messaging engine, the plurality of messages.

2. The computer program product of claim 1, wherein the one or more topic priority preferences are received from a subscriber messaging engine.

3. The computer program product of claim 1, wherein the plurality of messages is received from at least two distinct topic spaces.

4. The computer program product of claim 1, wherein the plurality of messages are prioritized in a min-heap data structure.

5. The computer program product of claim 1, wherein at least one topic space of a set of message topics comprise a main message topic and one or more sub message topics.

6. The computer program product of claim 1, wherein each message of the plurality of messages, from the publisher, that do not comprise a message expiration time, do not expire.

7. A computer system for prioritizing messages, the computer system comprising:
one or more computer processors;
one or more non-transitory computer-readable storage media;
program instructions stored on the computer-readable storage media for execution by at least one of the one or more processors, the program instructions comprising:
program instructions to receive, by a message engine, a plurality of messages from a publisher, wherein each message of the plurality of messages correspond to at least one topic space, and comprise a message expiration time and a publisher priority value, and wherein the publisher priority value details an importance level for a corresponding message;
responsive to receiving the plurality of messages from the publisher, program instructions to prioritize, by the message engine, the plurality of messages, based on the priority value and the corresponding at least one topic space;
program instructions to determine, by the messaging engine, that a subscriber is subscribed to a topic space corresponding to at least one message of the plurality of messages;
program instructions to receive, by the messaging engine, one or more topic priority preferences from the subscriber and an expiration threshold priority setting from the subscriber, wherein the one or more topic priority preferences detail a ranking associated with each topic space, and wherein the expiration threshold priority setting, details a threshold amount of time to increase a priority level of a message;
responsive to receiving one or more topic priority preferences from the subscriber program instructions to determine, by the message engine, a delivery order of the plurality of messages, wherein the delivery order comprises:
program instructions to sort the plurality of messages based on topic space: program instructions to identify at least a first topic space, and a second topic space, wherein the first topic space is a highest ranked topic space and the second topic space is a second highest ranked topic space;
program instructions to place a first set of messages that correspond to the first topic space in a first position of a delivery order based on the publisher priority value; and
program instructions to place a second set of messages that correspond to the second topic space in a second position of a delivery order based on the publishers priority value;
program instructions to send, by the message engine, the plurality of messages to the subscriber based on the determined delivery order;
determine, by the messaging engine, whether at least one message, of the plurality of messages, is within the expiration threshold priority setting as set by the subscriber, prior to being delivered to the subscriber;
in response to determining that at least one message of the plurality of messages, is within the expiration threshold priority setting, increase the determined priority of the at least one message by, placing an interrupt to an interrupt vector table ensuring, that the at least one message will be delivered prior to the message expiration time; and
responsive to increasing the determined priority of the at least one message, reprioritize, by the messaging engine, the plurality of messages.

8. The computer system of claim 7, wherein the one or more topic priority preferences are received from a subscriber messaging engine.

9. The computer system of claim 7, wherein the plurality of messages is received from at least two distinct topic spaces.

10. The computer system of claim 7, wherein at least one topic space of a set of message topics comprise a main message topic and one or more sub message topics.

11. The computer system of claim 7, wherein each message of the plurality of messages, from the publisher, that do not comprise a message expiration time, do not expire.

* * * * *